Dec. 27, 1932.  E. S. HALL  1,891,927
POWER TRANSMISSION MECHANISM
Filed March 26, 1930   2 Sheets-Sheet 1
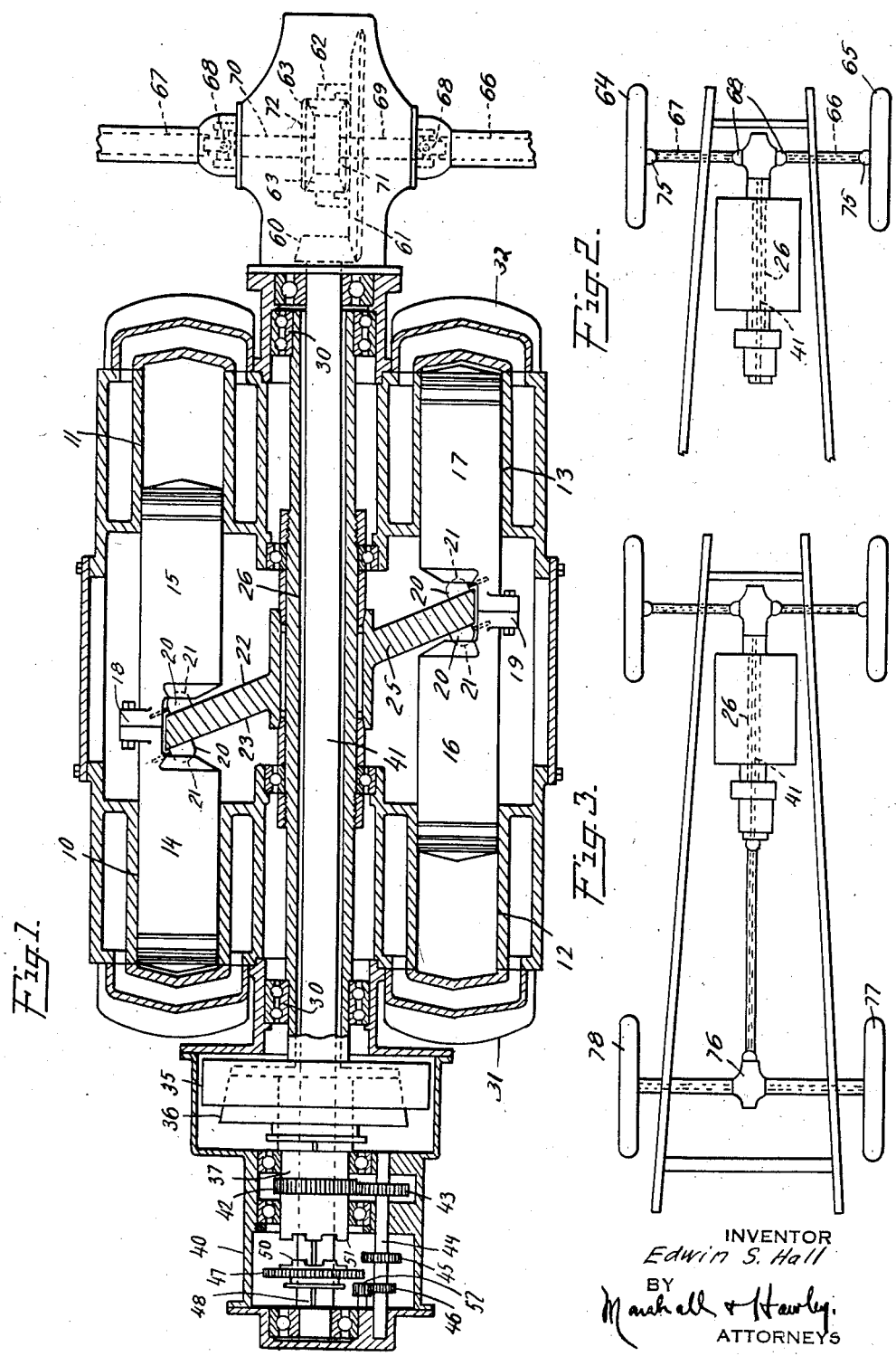
INVENTOR
Edwin S. Hall
BY
Marshall & Hawley
ATTORNEYS Dec. 27, 1932.    E. S. HALL    1,891,927
POWER TRANSMISSION MECHANISM
Filed March 26, 1930    2 Sheets-Sheet 2

INVENTOR
Edwin S. Hall
BY
Marshall & Hawley,
ATTORNEYS

Patented Dec. 27, 1932

1,891,927

UNITED STATES PATENT OFFICE

EDWIN S. HALL, OF NEW HAVEN, CONNECTICUT, ASSIGNOR TO MICHELL-CRANKLESS ENGINES CORPORATION, OF NEW YORK, N. Y., A CORPORATION OF NEW YORK

POWER TRANSMISSION MECHANISM

Application filed March 26, 1930. Serial No. 438,986.

This invention relates to power transmission mechanisms.

More particularly stated, the invention relates to motor vehicle driving connections for transmitting the power from the engine to the wheels of the vehicle.

As is well known, variable speed transmission mechanism or gearing is interposed between the engine or crank shaft and the wheel axles of the motor vehicle. With the ordinary rear wheel drive the transmission is mounted in a convenient and accessible location in the rear of the engine and between the crank shaft and the transmission shaft which extends rearwardly to the rear axle. However, with the advent of the front wheel drive, the variable or change speed transmission mechanism has been placed in the front of the engine since the wheel axles to be driven are disposed at the front of the vehicle and the transmission must be interposed between the engine or crank shaft and the wheel axles. This location of the transmission or change speed gearing is inaccessible and inconvenient since it is far removed from the vehicle operator or driver. Furthermore, this constuction has necessitated the lengthening of the engine hood to accommodate the transmission and has also caused the engine to be placed farther back on the vehicle chassis than is customary or usual.

This invention has for its salient object to provide a simple, practical, compact and efficient arrangement of the driving connections between the engine shaft and the parts driven thereby, such as the wheel axles.

Another object of the invention is to provide driving connections between an engine shaft and shafts or axles driven thereby, so constructed and arranged that the variable speed transmission mechanism can be arranged at one end of the engine and the driven shafts or axles can be placed at the other end of the engine.

Further objects of the invention will appear from the following specification taken in connection with the drawings, which form a part of this application, and in which Fig. 1 is a sectional elevation showing an engine, transmission mechanism, wheel axles, and the driving connections between the transmission mechanism and axles;

Fig. 2 is a diagrammatic plan view showing a portion of a vehicle and front wheel driving connections arranged in the manner illustrated in Fig. 1;

Fig. 3 is a diagrammatic plan view of a motor vehicle chassis showing the engine and driving connection for the front and rear axles constructed in accordance with the invention;

Figure 4:
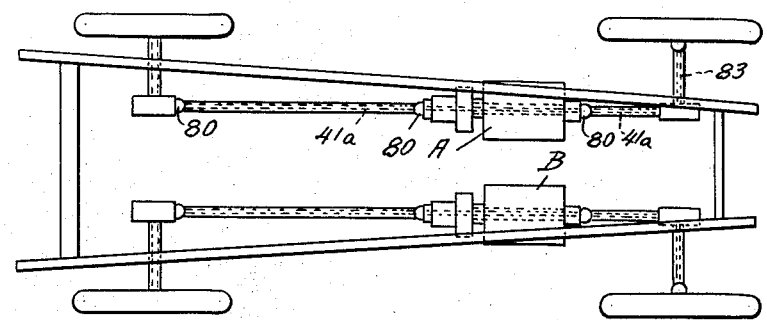
Fig. 4 is a diagrammatic plan view showing separate engines for driving the wheels at the two sides of the vehicle and driving connections constructed in accordance with the invention.

The invention briefly described consists of an engine having an engine shaft driven thereby, a transmission shaft for transmitting the power derived from the engine shaft to the wheel axles or other operative parts of the vehicle, and a variable speed transmission between the transmission shaft and the engine shaft. The engine shaft and transmission shaft are so relatively constructed and arranged that the change speed transmission or operative connection between the engine shaft and transmission shaft may be located at one end of the engine and the transmission shaft may extend through the engine and be operatively connected to drive axles or shafts disposed at the other end of the engine. This is accomplished by providing a hollow engine shaft in conjunction with an engine of the type having the cylinders arranged parallel to the engine axis or engine shaft and operative driving connections between the engine pistons and the shaft. The engine shaft may be connected through suitable change speed or variable speed transmission mechanism to the transmission shaft which extends through the hollow engine shaft and can be connected at its opposite end through any suitable gearing connection, such as differential gearing, to drive the wheel axles or other operative parts of the vehicle.

Further details of the invention will appear from the following description.

In the particular embodiment of the invention illustrated in Fig. 1, there is shown a swash plate type of engine comprising a plurality of sets of opposed cylinders 10, 11, 12 and 13. Pistons 14, 15, 16 and 17 are mounted in the cylinders and are reciprocated in the usual manner in the internal combustion engine.

The pistons 14 and 15 and 16 and 17 are connected respectively by yokes 18 and 19 and slipper pads 20 are disposed in bearings 21 carried by the yokes. The slipper pads 20 engage opposite faces 22 and 23 of a swash plate or slant 25 which is mounted on a hollow engine shaft 26. The engine shaft 26 is mounted in suitable bearings 30, located in the respective heads 31 of the engine.

Although a swash plate type of drive between the pistons and engine shaft has been described in the preceding paragraph, it should be understood that the invention is not limited to this particular form of driving connection but that other connections may be utilized, such as the wobble plate or stroke plate or cams of suitable conformation.

The hollow engine shaft 26 extends rearwardly through the engine casing and has connected thereto a clutch member 35 which coacts with a clutch member 36 carried by a sleeve 37. The sleeve 37 extends rearwardly into the transmission casing 40 and may be connected through any suitable or desired form of variable transmission speed gearing to the transmission shaft 41. In the particular form of transmission illustrated in Fig. 1, a gear 42 is mounted on the sleeve 37 and meshes with a gear 43 mounted on a jack shaft 44. Shaft 44 has also mounted thereon a pair of gears 45 and 46. The gear 45 is adapted to mesh with a gear 47 slidably mounted on or splined, as shown at 48, to the transmission shaft 41. The hub of the gear 47 also has formed thereon clutch teeth 50 which are adapted to coact with complementary clutch teeth 51 formed on the outer end of the sleeve 37.

The gear 46 on the shaft 44 meshes with an idler gear 52, which in turn is adapted to mesh with the gear 47.

The variable speed transmission mechanism above described operates as follows: The gear connection 42, 43 between the sleeve 37 and the shaft 44 causes the shaft to be rotated. When the gear shift lever is moved to a position in which the gear 47 meshes with the gear 45, the power transmission shaft 41 will be driven at slow speed. In order to transmit the drive at direct speed, the clutch teeth 50 are moved into coaction with the clutch teeth 51. When the gear 47 is moved rearwardly into mesh with the gear 52, the power transmission shaft 41 is driven in a reverse direction relative to the direction of rotation of the engine shaft.

In the embodiment of the invention illustrated in Figs. 1 and 2, the power transmission shaft 41 has mounted on the front end thereof a bevel gear 60 which meshes with a gear 61, to which is connected a spider 62 having planet gears 63 mounted thereon. The front wheels 64 and 65 of the vehicle have connected thereto wheel axles 66 and 67, which in turn are connected through universal joints 68 to shafts 69 and 70. The inner ends of the shafts 69 and 70 have secured thereto bevel gears 71 and 72 which are driven by the planet gears 63 carried by the spider 62. The construction just described constitutes the usual well known differential driving mechanism and any desired form of differential mechanism may be utilized. In Fig. 2 there are shown universal joints 75 which are preferably interposed between the wheel axles and the wheels 64 and 65.

From the above description it will be seen that a front wheel drive has been designed in which the transmission or change speed gearing and clutch mechanism are disposed at one end of the engine and the power transmission shaft extends through the engine and is connected to the parts driven thereby, such as the wheel axles, at the other end of the engine.

The construction shown in Fig. 3 is similar to that illustrated in Figs. 1 and 2 but differs therefrom in that the power transmission shaft 41 is carried rearwardly through the variable speed transmission case and is connected through a differential gear 76 to the rear wheels 77 and 78 of the vehicle. Thus it will be seen that in Fig. 3 all four wheels of the vehicle will be positively driven by the engine.

Figure 6:
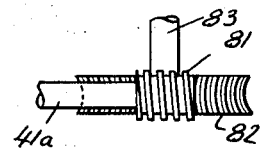
Fig. 6 is a detail sectional elevation showing a driving connection between the transmission shaft and the wheel axle.

In Fig. 4 engines A and B, similar to that shown in Fig. 1, are provided at the two sides of the vehicle chassis, each engine being operatively connected to drive the wheels on the side of the chassis on which the engine is located. For instance, the engine A has its power transmission shaft 41a extend rearwardly through the transmission case and forwardly through the engine. Suitable universal joints 80 are provided, as desired. The front end of the shaft 41a is connected through any desired form of transmission or gearing to the axle of the front wheel and a similar connection is made between the rear end of the shaft and the axle of the rear wheel. In Fig. 6 the front end of the shaft 41a is shown as provided with a worm gear 81 which meshes with and drives a worm wheel 82 mounted on the wheel axle 83. A similar worm drive connection is indicated at the rear end of the shaft 41a in Fig. 4. The connections between the motor B and the front and rear wheels are made in the same manner as described in connection with the motor A.

Figure 5:
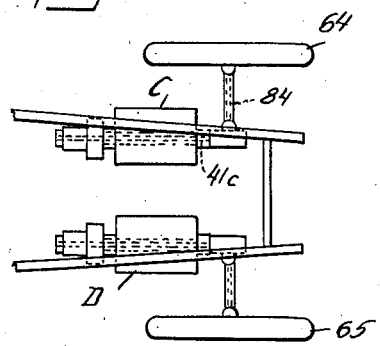
Fig. 5 is a diagrammatic plan view, partly broken away, showing the front end of a vehicle and a separate motor for driving each of the front wheels.

In Fig. 5 two motors C and D are illustrated for driving the front wheels 64 and 65. The motors C and D are connected to the wheel axles in any suitable manner as, for instance, in the manner described in connection with Fig. 4. The worm gear connection shown in Fig. 6 may be utilized between the power transmission shaft 41c and the wheel axle 84.

Figure 7:
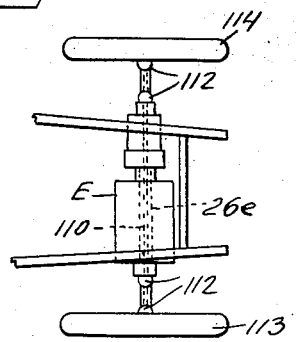
Fig. 7 is a diagrammatic plan view similar to Fig. 5 but showing the engine as mounted in alinement with the wheel axles.
Figure 8:
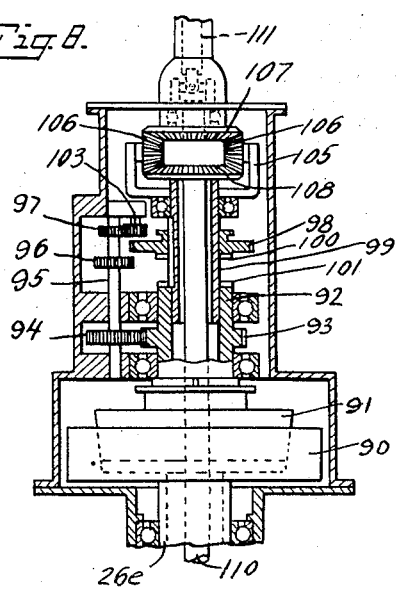
Fig. 8 is a sectional elevation showing the variable speed and differential mechanisms utilized when the engine is mounted in the manner shown in Fig. 7.

In the embodiment of the invention illustrated in Figs. 7 and 8, the motor is mounted on an axis disposed in alinement with the front wheel axles. The motor E has its hollow shaft 26e connected through clutch elements 90 and 91 to a sleeve 92. The sleeve 92 has mounted or formed thereon a gear 93 which meshes with a gear 94 carried by a jack shaft 95. Gears 96 and 97 are also mounted on the jack shaft. The gear 96 is adapted to mesh with a gear 98 which is splined on a hollow shaft 99. The hub of the gear 98 has clutch teeth 100 formed thereon adapted to coact with complementary clutch teeth 101 formed on the end of the hollow shaft 92. The gear 97 meshes with an idler gear 103, which in turn is adapted to mesh with the gear 98.

The hollow shaft 99 has secured to the end thereof, a spindle 105 on which are mounted planetary gears 106 which mesh with a pair of bevel gears 107 and 108. The gear 108 is mounted on a wheel axle 110 and the gear 107 is mounted on the oppositely extending wheel axle 111. The axle 110 extends through the engine E and is connected through suitable universal joints 112 to wheel 113. The other axle 111 is connected through suitable universal joints 112 to the wheel 114.

From the foregoing description it will be evident that a simple, practical, compact and efficient power transmission or driving connection has been designed and that the arrangement disclosed renders it possible to locate the variable speed transmission mechanism at one end of the engine and to drive parts from said variable speed transmission, located at the opposite end of the engine. This is rendered possible by utilizing an engine of the type described having a hollow engine shaft and passing the power transmission shaft through the engine shaft. It will be observed that the clutch and transmission casing 40 is supported by one engine head 31 and the differential mechanism carried by the other head 32 and that the weight distribution of the entire engine including the transmission and differential mechanisms is such as to maintain the entire unit in a substantially balanced relation.

Although certain specific embodiments of the invention have been particularly shown and described, it will be understood that the invention is capable of modification and that changes in the construction and in the arrangement of the various cooperating parts may be made without departing from the spirit or scope of the invention, as expressed in the following claims.

What I claim is:

1. In combination, an engine comprising a shaft, cylinders and pistons effective to drive the shaft, disposed about said shaft in balanced relation and parallel thereto, a head for said cylinders at each end of the engine, a second shaft concentric with and overlapping said engine shaft, driving connections between said shafts supported adjacent one of said heads and a differential gearing connected to said second shaft and mounted adjacent the other head.

2. In combination, an engine comprising a shaft, cylinders and pistons effective to drive the shaft, disposed about said shaft in balanced relation and parallel thereto, a head for said cylinders at each end of the engine, a second shaft concentric with and overlapping said engine shaft, variable speed driving connections between said shafts supported adjacent one of said heads and a differential gearing connected to said second shaft and mounted adjacent the other head.

3. In combination, an engine comprising a shaft, cylinders and pistons effective to drive the shaft, disposed about said shaft in balanced relation and parallel thereto, a head for said cylinders at each end of the engine, a shaft to be driven at one end of the engine, and transmission mechanism operatively connected to said engine shaft and driven shaft, said mechanism being disposed at the other end of the engine and adjacent one of said heads.

4. In a motor vehicle, a pair of axially aligned wheels, wheel axles connected thereto, an internal combustion engine mounted coaxially with said axles and having cylinders and pistons effective to drive the shaft disposed about said shaft in balanced relation and parallel thereto, a head for said cylinders at each end of the engine, a transmission shaft operatively connected to and coaxial with said engine shaft, a variable speed driving connection between said shafts and supported adjacent one of said heads and a differential gearing supported adjacent the other of said heads.

EDWIN S. HALL.